(12) United States Patent
Hayashi et al.

(10) Patent No.: US 9,959,814 B2
(45) Date of Patent: May 1, 2018

(54) DISPLAY DEVICE AND DISPLAY METHOD

(71) Applicant: EIZO Corporation, Ishikawa (JP)

(72) Inventors: Akinori Hayashi, Ishikawa (JP);
Nobunari Tabata, Ishikawa (JP);
Masanori Katsura, Ishikawa (JP);
Daiki Takeda, Ishikawa (JP); Tatsunori Fuchino, Ishikawa (JP); Masahiro Kasashima, Ishikawa (JP)

(73) Assignee: EIZO Corporation, Ishikawa (JP)

( * ) Notice: Subject to any disclaimer, the term of this patent is extended or adjusted under 35 U.S.C. 154(b) by 44 days.

(21) Appl. No.: 15/036,027

(22) PCT Filed: Nov. 7, 2014

(86) PCT No.: PCT/JP2014/079545
§ 371 (c)(1),
(2) Date: May 11, 2016

(87) PCT Pub. No.: WO2015/068791
PCT Pub. Date: May 14, 2015

(65) Prior Publication Data
US 2016/0293114 A1    Oct. 6, 2016

(30) Foreign Application Priority Data

Nov. 11, 2013  (JP) .................................. 2013-233333

(51) Int. Cl.
*G09G 3/34* (2006.01)
*G02F 1/1335* (2006.01)
*G09G 3/36* (2006.01)

(52) U.S. Cl.
CPC ..... *G09G 3/3406* (2013.01); *G02F 1/133603* (2013.01); *G09G 3/3607* (2013.01);
(Continued)

(58) Field of Classification Search
CPC ......... G09G 2320/0257; G09G 3/3406; G09G 3/3607; G09G 2310/0237; G09G 2320/064; G02F 1/133603
See application file for complete search history.

(56) References Cited

U.S. PATENT DOCUMENTS

2002/0008683 A1    1/2002  Makino et al.
2004/0041760 A1*   3/2004  Tsumura ................ G09G 3/342
                                                                345/87
(Continued)

FOREIGN PATENT DOCUMENTS

JP    H05-303078 A    11/1993
JP    2001-343943 A   12/2001
(Continued)

OTHER PUBLICATIONS

International Search Report dated Feb. 10, 2015 in corresponding International Application No. PCT/JP2014/079545; 6 pgs.
(Continued)

*Primary Examiner* — Abhishek Sarma
(74) *Attorney, Agent, or Firm* — Maier & Maier, PLLC

(57) ABSTRACT

Provided is a display device and display method that can improve the moving image display performance. A display device includes a display panel and a backlight for the display panel. The display device also includes control means configured to output a control signal for controlling illumination and extinction of the backlight, to the backlight in synchronization with start of update of a frame on the display panel and update means configured to update a frame in each predetermined period in order to change one image displayed on a screen of the display panel. The control means outputs a control signal for controlling the backlight so that the backlight starts to illuminate after the update means starts to update one frame and ends illumination at the
(Continued)

time point when the update means starts to update a frame subsequent to the one frame or after the time point.

7 Claims, 18 Drawing Sheets

(52) U.S. Cl.
CPC ............... *G09G 2310/0237* (2013.01); *G09G 2320/0257* (2013.01); *G09G 2320/064* (2013.01)

(56) References Cited

U.S. PATENT DOCUMENTS

| | | |
|---|---|---|
| 2011/0096101 A1 | 4/2011 | Lee et al. |
| 2011/0279490 A1 | 11/2011 | Lee et al. |

FOREIGN PATENT DOCUMENTS

| | | |
|---|---|---|
| JP | 2003-255914 A | 9/2003 |
| JP | 2004-093717 A | 3/2004 |
| JP | 2013-251792 A | 12/2013 |
| JP | 2013-254149 A | 12/2013 |
| WO | 2013/047230 A1 | 4/2013 |

OTHER PUBLICATIONS

Extended European Search Report dated Jul. 12, 2016, including the Supplemental European Search Report and the European Search Opinion, in connection with corresponding EP Application No. 14860719.5 (11 pgs.).

\* cited by examiner

DISPLAY DEVICE AND DISPLAY METHOD

TECHNICAL FIELD

The present invention relates to a display device including a display panel and a backlight, and a display method.

BACKGROUND ART

A transmission type display device, such as a liquid crystal display device or a micro-electro-mechanical system (MEMS) display device, includes a display panel and a backlight disposed on the back of the display panel and employs so-called PWM dimming as a method for adjusting the luminance (brightness) of the display panel. PWM dimming involves adjusting the current supplied to the backlight, for example, by changing the pulse width (duty ratio) of a pulse signal.

Blinking backlight control, which allows for an improvement in the visibility of moving images on a display panel on the principle of PWM dimming, has been used in recent years. Blinking backlight control involves blinking a backlight in synchronization with a vertical synchronization signal when the field of a video signal on the display panel ends and preventing the display of images in the backlight extinction period to reduce overlaps between images (see Patent Literature 1).

CITATION LIST

Patent Literature

Patent Literature 1: Japanese Unexamined Patent Application Publication No. 5-303078

SUMMARY OF INVENTION

Technical Problem

However, with regard to Patent Literature 1, which blinks the backlight in synchronization with a vertical synchronization signal, for example, if the backlight starts to illuminate before the liquid crystal state of the previous frame makes a complete transition to the liquid crystal state of the current frame, there occurs a phenomenon (called "ghost") in which the liquid crystal state of the previous frame reflects on the display image. Further, when the backlight illumination end time point (backlight extinction start time point) is delayed with respect to a vertical synchronization signal, the period in which the current frame is illuminated by the backlight would overlap the period in which the liquid crystal state of the current frame is being changed to the liquid crystal state of the subsequent frame. This would disadvantageously cause a phenomenon (called "leading edge") in which the liquid crystal state of the subsequent frame reflects on the display image and degrade the moving image display performance.

The present invention has been made in view of the foregoing, and an object thereof is to provide a display device and display method that can improve the moving image display performance.

Solution to Problem

A first aspect of the present invention provides a display device that includes a display panel and a backlight for the display panel. The display device includes control means configured to, in synchronization with start of update of a frame on the display panel, output a control signal for controlling illumination and extinction of the backlight, to the backlight and update means configured to update a frame in each predetermined period in order to change one image displayed on a screen of the display panel. The control means outputs a control signal for controlling the backlight so that the backlight starts to illuminate after the update means starts to update one frame and ends illumination at the time point when the update means starts to update a frame subsequent to the one frame or after the time point.

According to a second aspect of the present invention, in the display device of the first aspect, the control means outputs a control signal for controlling the backlight so that the backlight ends illumination after a predetermined time has elapsed since the subsequent frame update start time point.

According to a third aspect of the present invention, the display device of the first or second aspect further includes adjustment means configured to adjust luminance of a screen of the display panel. The control means outputs a control signal for controlling the time point when the backlight starts to illuminate, in response to an adjustment made by the adjustment means.

According to a fourth aspect of the present invention, in the display device of any one of the first to third aspects, the update means updates multiple frames in the respective predetermined periods. When $Tg>0$, the control means outputs a control signal so that $Tg>Te$; $Tg$ represents a time represented by a formula $\{Td-[Tc-(Ta+Tb)]\}$; $Ta$ represents a time required to update one frame; $Tb$ represents a response time corresponding to a change in a gradation value of the display panel; $Tc$ represents the predetermined period; $Td$ represents a time from the time point when the backlight starts to illuminate after the update means starts to update one frame to the time point when the update means starts to update a frame subsequent to the one frame; and $Te$ represents a time from the time point when the update means starts to update the subsequent frame to the time point when the backlight ends illumination.

A fifth aspect of the present invention provides a display method used by a display device that includes a display panel and a backlight for the display panel. The display method includes a step of outputting a control signal for controlling illumination and extinction of the backlight, to the backlight in synchronization with start of update of a frame on the display panel and a step of updating a frame in each predetermined period in order to change one image displayed on a screen of the display panel. The outputting step includes outputting a control signal for controlling the backlight so that the backlight starts to illuminate after update of one frame is started and ends illumination at the time point when update of a frame subsequent to the one frame is started or after the time point.

In the first and fifth aspects of the present invention, the control means outputs a control signal for controlling the illumination and extinction of the backlight, to the backlight in synchronization with the start of update of a frame on the display panel. The term "in synchronization with the start of update of a frame on the display panel" refers to, for example, in synchronization with a vertical synchronization signal of the display panel or a data enable signal which allows for the determination of vertical synchronization such as the blanking period for controlling the display panel. The control signal may be any form of signal as long as it allows for the determination of the backlight illumination start time point and the backlight illumination end time point (the backlight extinction start time point). For example, the control signal may be a PWM control signal, which changes the pulse width (e.g., the backlight illumination period). If the period of the vertical synchronization signal is T (e.g., 120 Hz, 8.33 mms), the period of the control signal is T (e.g., 120 Hz, 8.33 mms) as well. As the backlight illumination period is increased, the luminance of the backlight can be increased; as the backlight illumination period is reduced, the luminance of the backlight can be reduced.

The update means updates a frame in each predetermined period in order to change one image displayed on the screen of the display panel. The predetermined period is the same as the period T of a vertical synchronization signal. It is assumed that during the display of moving images on the screen of the display panel, for example, a white image (e.g., the gradation value 255) is changed to a black image (e.g., the gradation value 0). In this case, the time required for the liquid crystal state to make a transition from the gradation value 255 to the gradation value 0 is referred to as a response time Tb. Note that the liquid crystal state need not make a transition from the gradation value 255 to the gradation value 0, but rather may make a transition from the gradation value 0 (black) to the gradation value 255 (white) or make a transition between other gradation values.

The control means outputs a control signal for controlling the backlight so that the backlight starts to illuminate after the update means starts to update one frame and ends illumination at the time point when the update means starts to update a frame subsequent to the one frame or after the time point. If the backlight starts to illuminate before the liquid crystal state makes a complete transition (that is, if the backlight starts to illuminate before the response time Tb of the display panel elapses), there may occur ghost, in which the liquid crystal state of the previous frame reflects on the display image. On the other hand, the liquid crystal state makes an extremely gentle transition immediately after the update means starts to update a frame, and the transition of the liquid crystal state (that is, the change in gradation value) is extremely small within a predetermined time from the time point when the update means starts to update a frame. By noting this point and outputting a control signal for controlling the backlight so that the backlight ends illumination at the time point when the update means starts to update the subsequent frame or after the time point, it is possible to delay the backlight illumination start time point with respect to a control signal in the same illumination period. By delaying the backlight illumination start time point, it is possible to make a nearly complete transition of the liquid crystal state before the backlight starts to illuminate and to bring the gradation value closer to that after transition. As a result, the effect of ghost can be reduced.

As stated above, the liquid crystal state makes an extremely gentle transition immediately after the update means starts to update a frame, and the transition of the liquid crystal state (that is, the change in gradation value) is extremely small within the predetermined time from the time point when the update means starts to update a frame. Accordingly, by setting the backlight illumination end time point (the backlight extinction start time point) in a range from the time point when the update means starts to update a frame to the time point when the predetermined time elapses, the effect of a leading edge can be reduced. Thus, it is possible to reduce the effect of ghost while reducing the effect of a leading edge. As a result, the moving image display performance can be improved.

In the second aspect of the present invention, the control means outputs a control signal for controlling the backlight so that the backlight ends illumination after a predetermined time has elapsed since the time point of start of update of the subsequent frame. For example, the control means outputs a control signal so that the backlight starts to end illumination when the predetermined time has elapsed since the time point of start of update of the subsequent frame. Since the time point when the backlight starts to end illumination can be delayed by the predetermined time compared to when setting such a time point to the time point when the update means starts to update the subsequent frame, it is possible to delay the time point when the backlight starts to illuminate, by a time corresponding to the delayed time. As a result, the effect of ghost can be reduced.

In the third aspect of the present invention, the display device further includes the adjustment means configured to adjust the screen luminance of the display panel, and the control means outputs a control signal for controlling the time point when the backlight starts to illuminate, in response to an adjustment made by the adjustment means. That is, in increasing the screen luminance of the display panel, the control means increases the backlight illumination period by advancing the time point when the backlight starts to illuminate; in reducing the screen luminance of the display panel, it reduces the backlight illumination period by delaying the time point when the backlight starts to illuminate. Thus, it is possible to always fix the time point when the backlight ends illumination (the time point when the backlight starts to extinguish). As a result, the effect of a leading edge can be reduced.

In the fourth aspect of the present invention, the update means updates a plurality of frames in the respective predetermined periods. The updates means updates a plurality of frames (e.g., two sub-frames) in order to rewrite the same image (one image) in each predetermined period T. That is, in order to display an image A, the update means write the same image A twice by updating two sub-frames in a predetermined period (update period) T. The image data which sub-frames have is not limited to the same image data. For example, an interpolation image data A' may be generated on the basis of the image data A, and two sub-frames may have the generated interpolation image data A'. Or, the first sub-frame may have the image data A, and the second sub-frame may have the generated interpolation image data A'.

When $Tg>0$, the control means outputs a control signal so that $Tg>Te$; Tg represents a time represented by a formula $\{Td-[Tc-(Ta+Tb)]\}$; Ta represents a time required to update one frame; Tb represents a response time corresponding to a change in a gradation value of the display panel; Tc represents the predetermined period; Td represents a time from the time point when the backlight starts to illuminate after the update means starts to update one frame to the time point when the update means starts to update a frame subsequent to the one frame; and Te represents a time from the time point when the update means starts to update the subsequent frame to the time point when the backlight ends illumination. The term "when $Tg>0$" means that the backlight starts to illuminate before the response time Tb of the display panel ends and means that so-called ghost occurs. The time Tg is a time that contributes to the occurrence of ghost. As Tg is increased, the effect of ghost is increased. The time Te is a time that contributes to the occurrence of a leading edge. When the predetermined time is exceeded, the effect of a leading edge appears. By outputting a control signal so that a relationship $Tg>Te$ is established, it is possible to reduce the effect of ghost while reducing the effect of a leading edge. As a result, the moving image display performance can be improved.

Advantageous Effects of Invention

According to the present invention, the moving image display performance can be improved.

DESCRIPTION OF EMBODIMENTS

Figure 1:
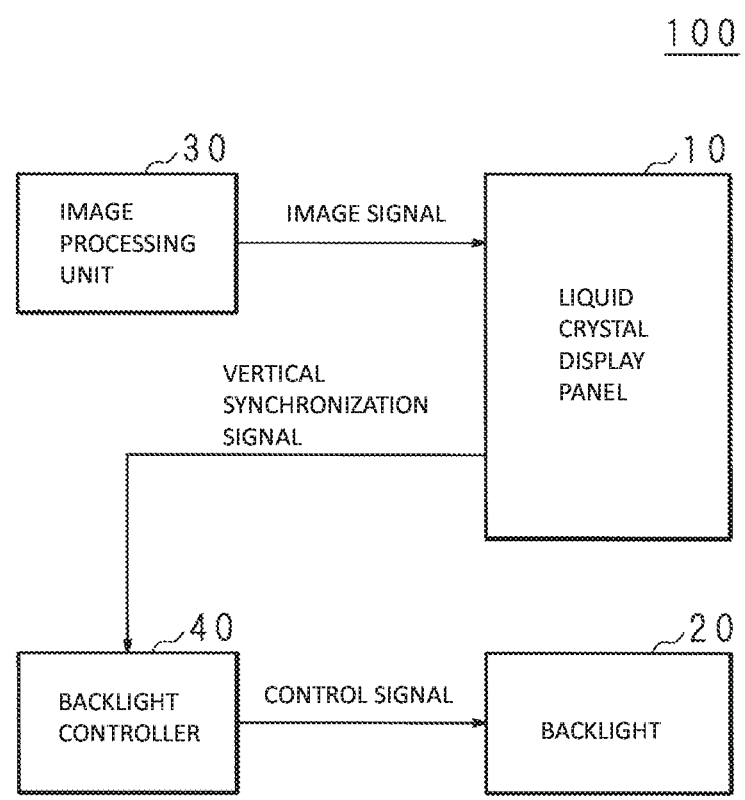
FIG. 1 is a block diagram showing an example configuration of a display device of the present embodiment.

Now, an embodiment of a display device and display method of the present invention will be described with reference to the drawings. FIG. 1 is a block diagram showing an example configuration of a display device 100 of the present embodiment. The display device 100 includes a liquid crystal display panel 10 as a display panel, a backlight 20 disposed on the back surface of the liquid crystal display panel 10, an image processing unit 30, and a backlight controller 40. Note that the display panel need not be a liquid crystal display panel and may be a display panel formed of any other light-shielding member. The display device 100 includes adjustment means (not shown) that adjusts the screen luminance of the liquid crystal display panel 10. The adjustment means may be an operation switch disposed on the display device 100 or may be an operation image displayed on the screen of the liquid crystal display panel 10.

The backlight 20 includes multiple LEDs which are connected in series, a transistor serving as a switching element for turning on/off the current flowing through the LEDs, and a bias resistor for controlling the current flowing through the base of the transistor to an appropriate value (these elements are not shown). When the current flows through the LEDs, the backlight 20 is turned on; when the current flowing through the LEDs is shut off, the backlight 20 is turned off.

The backlight controller 40 serves as control means. In synchronization with the start of update of the frame on the liquid crystal display panel 10, the backlight controller 40 outputs a control signal for controlling the turn-on/off of the backlight 20, to the backlight 20. The term "in synchronization with the start of update of the frame of the liquid crystal display panel 10" refers to, for example, in synchronization with a vertical synchronization signal of the liquid crystal display panel 10 or a data enable signal (DE signal) that allows for the determination of vertical synchronization such as the blanking period for controlling the liquid crystal display panel 10.

The control signal may be of any form as long as it allows for the determination of the time point when the backlight 20 starts to illuminate and the time point when it starts to end illumination (the time point when it start to extinguish). For example, the control signal may be a PWM control signal, which changes the pulse width (e.g., the backlight illumination period).

Figure 2:
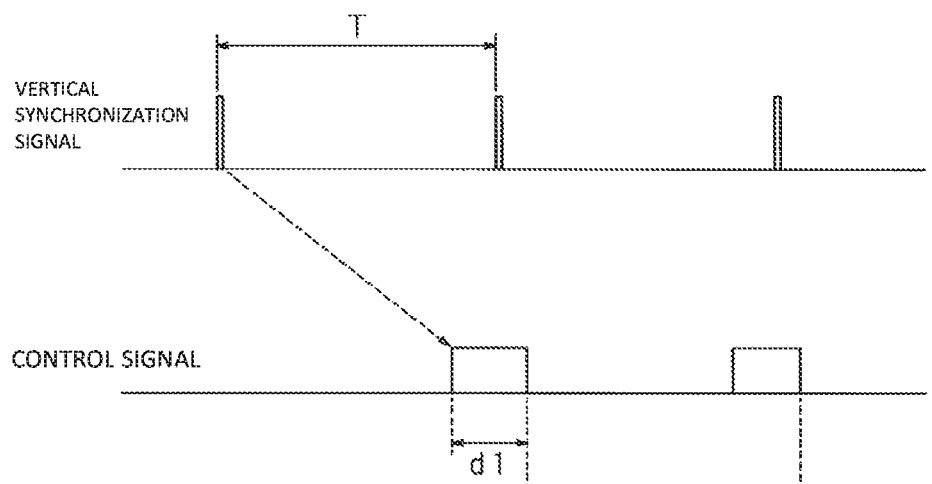
FIG. 2 is a time chart showing an example of the relationship between a vertical synchronization signal and a control signal.
Figure 2:
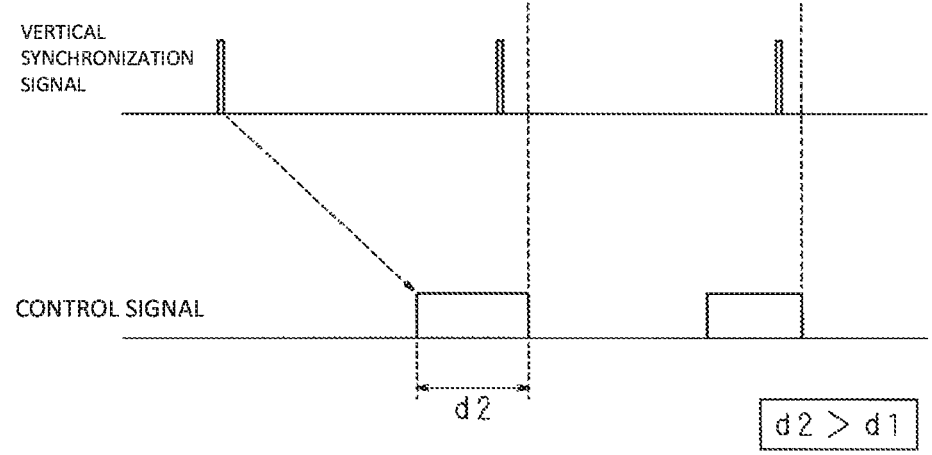

FIG. 2 includes time charts showing an example of the relationship between a vertical synchronization signal and a control signal. As shown in FIG. 2, if the period of the vertical synchronization signal is T (e.g., 120 Hz, 8.33 mms), the period of the control signal is T (e.g., 120 Hz, 8.33 mms) as well. FIG. 2A shows a case in which the backlight 20 has a low luminance; FIG. 2B shows a case in which the backlight 20 has a high luminance. That is, reducing the luminance of the backlight 20 only requires reducing the illumination period of the backlight 20 (the period from the illumination start time point to the illumination end time point) (to d1 in the example in FIG. 2A). On the other hand, increasing the luminance of the backlight 20 only requires increasing the illumination period of the backlight 20 (the period from the illumination start time point to the illumination end time point) (to d2 where d2>d1 in the example in FIG. 2B). In the present embodiment, as shown in FIG. 2, the illumination end time point (the extinction start time point) of the backlight 20 may be fixed, regardless of the length of the illumination period of the backlight 20.

The image processing unit 30 reads, for example, image data acquired from an external device or image data stored in a storage device (not shown) and outputs the image data as an image signal to the liquid crystal display panel 10. In the present embodiment, an image signal is also referred to as a video signal.

The liquid crystal display panel 10 serves as update means and changes the image displayed on the screen thereof by updating the frame in each predetermined period. The predetermined period is the interval between vertical synchronization signals of the liquid crystal display panel 10. The predetermined period is, for example, 120 Hz, but is not limited thereto and may be 60 Hz, 240 Hz, or the like.

Figure 3:
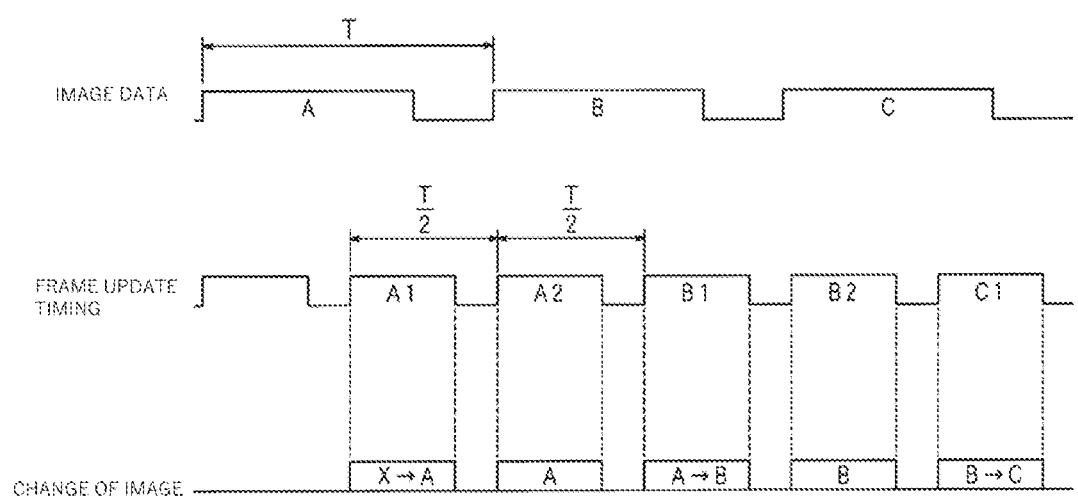
FIG. 3 is a time chart showing an example of the frame update timing.

FIG. 3 is a time chart showing an example of the frame update timing. As shown in an upper chart of FIG. 3, the liquid crystal display panel 10 sequentially acquires image data A, image data B, image data C, and the like from the image processing unit 30 in respective predetermined periods T. The image data A, image data B, and image data C represent images A, B, and C, respectively. The predetermined period T is, for example, 120 Hz (8.33 ms), but is not limited thereto.

The liquid crystal display panel 10 updates the frame in each predetermined period T. As shown in a middle chart of FIG. 3, the liquid crystal display panel 10 updates the same image frame twice in each predetermined period T. Frames in a predetermined period T will be referred to as subframes. The period of a sub-frame is T/2. In the example in FIG. 3, in order to display the image A, the image data A is changed to sub-frames A1 and A2 having the image data A. Similarly, the image data B is changed to sub-frames B1 and B2 having the image data B. The image data which two sub-frames have is not limited to the same image data. For example, an interpolation image data A' may be generated on the basis of the image A, and two sub-frames may have the generated interpolation image data A'. Or, the first sub-frame may have the image data A, and the second sub-frame may have the generated interpolation image data A'

As shown in a lower chart of FIG. 3, an image X written using the previous sub-frame remains in the sub-frame A1. Accordingly, the image X is gradually changed to the image A. The image A (or the interpolation image A' described above) has been already written at the time point when the sub-frame A1 ends. Then, the image A is written again using the sub-frame A2 and therefore only the image A is displayed. This applies to the image B as well.

Next, ghost and leading edge, which affect the moving image display performance, will be described. First, ghost will be described. Ghost refers to a phenomenon in which if the backlight 20 starts to illuminate before the liquid crystal state of the previous frame makes a complete transition to the liquid crystal state of the current frame, the liquid crystal state of the previous frame reflects on the display image.

Figure 4:
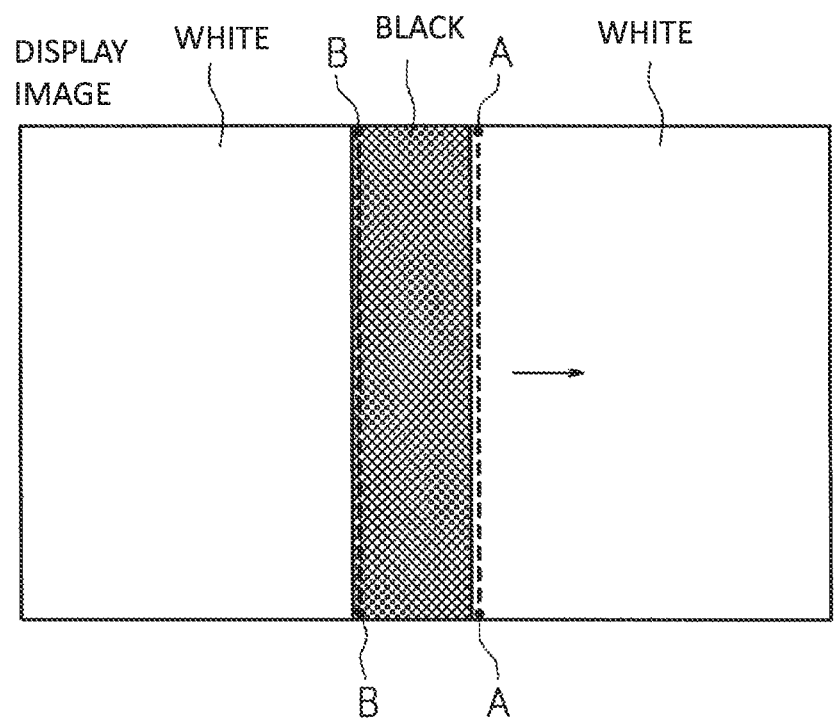
FIG. 4 is a schematic diagram showing an example of a display image on the screen of a liquid crystal display panel.

FIG. 4 is a schematic diagram showing an example of the display image on the screen of the liquid crystal display panel 10. The example in FIG. 4 is an example of moving images and shows a case in which a belt-shaped black image is moving on a white screen from the left to the right at any time point. A longitudinal line shown by reference sign A is a pixel line which lies outside, and is closest to, the belt-shaped black image and shows an area in which white is being changed to black. A longitudinal line shown by reference sign B is a pixel line which lies inside, and serves as the leftmost edge of, the belt-shaped black image and shows an area in which black is being changed to white.

Figure 5:
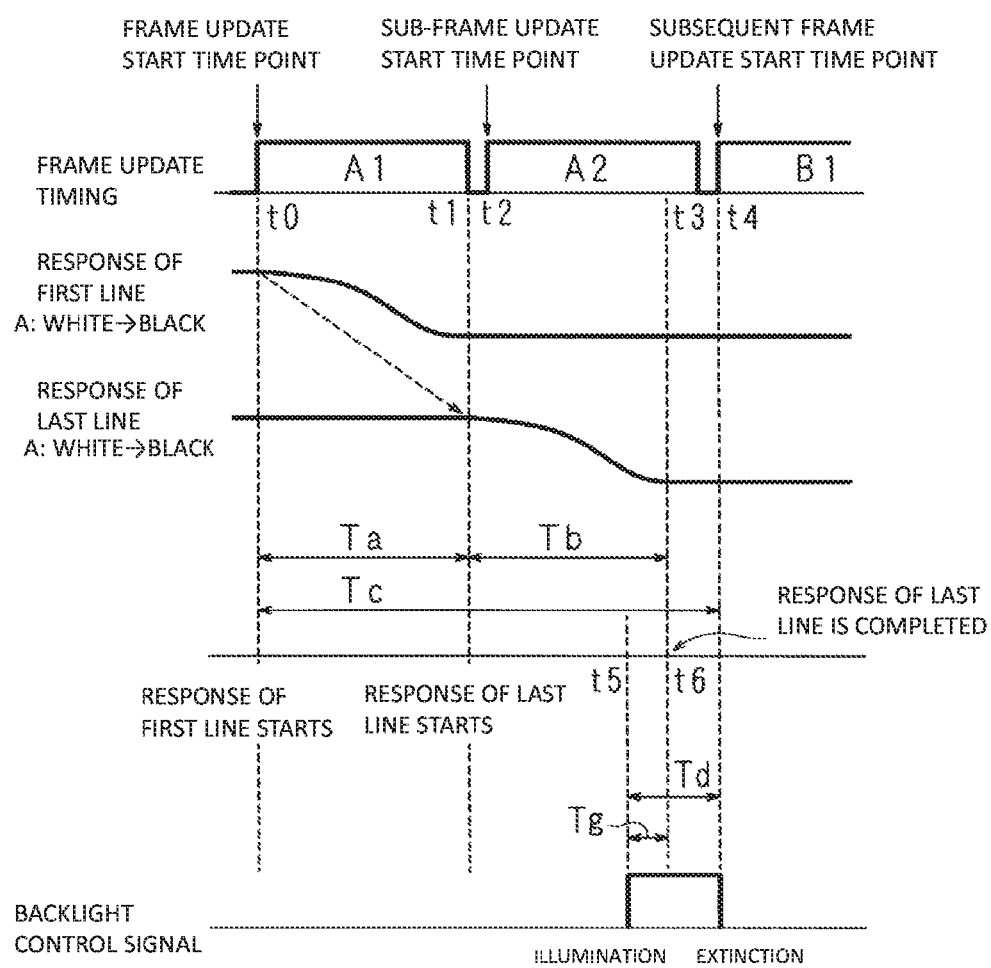
FIG. 5 is a time chart showing a first example in which ghost occurs.

FIG. 5 is a time chart showing a first example in which ghost occurs. The time chart shown in FIG. 5 shows time passage around the right edge of the belt-shaped black image shown in FIG. 4. As shown in FIG. 5, in the frame update timings, a frame update start time point (a sub-frame A1 update start time point) is t0; a sub-frame A1 update end time point is t1; a sub-frame A2 update start time point is t2; a sub-frame A2 update end time point is t3; and a subsequent frame update start time point (a sub-frame B1 update start time point) is t4.

At time point t0, the first pixel line (the highest horizontal pixel line) of the screen of the liquid crystal display panel 10 starts to make a response, and the gradation value (luminance) is changed, for example, from 255 (white) to 0 (black). Then, the second highest and lower pixel lines of the screen of the liquid crystal display panel 10 sequentially start to make responses indicating gradual gradation value changes. At time point t1, when a time Ta has elapsed after time point t0, that is, at the time point when one frame has been updated, the last pixel line (the lowest horizontal pixel line) of the screen of the liquid crystal display panel 10 starts to make a response, and the gradation value (luminance) is being changed, for example, from 255 (white) to 0 (black). A response time Tb taken for the liquid crystal state of the white image (e.g., the gradation value 255) to make a complete transition to the liquid crystal state of the black image (e.g., the gradation value 0) is (t6−t1) where t6 is the time point when a response of the last pixel line was finished. Accordingly, it can be said that the liquid crystal state has not made a complete transition (e.g., the gradation value has not become 0) before time point t6 and that the liquid crystal state has made a complete transition (e.g., the gradation value has become 0) at time point t6 and later.

There is established a relationship Tc>(Ta+Tb) where Tc is a predetermined period from the frame update start time point t0 to the subsequent frame update start time point t4. The backlight 20 starts to illuminate at time point t5 and continues to illuminate for an illumination time Td.

In the transition of the liquid crystal state described above, for example, it is assumed that the backlight 20 starts to illuminate at time point t5, which is earlier than time point t6. During a time Tg between time point t5 and time point t6, the liquid crystal state of the previous frame (e.g., the state of the sub-frame A1, that is, the state in which an image X is being changed to the image A, in the example in FIGS. 4 and 5) reflects on the display image, and ghost occurs around the right edge of the belt-shaped black image.

Figure 6:
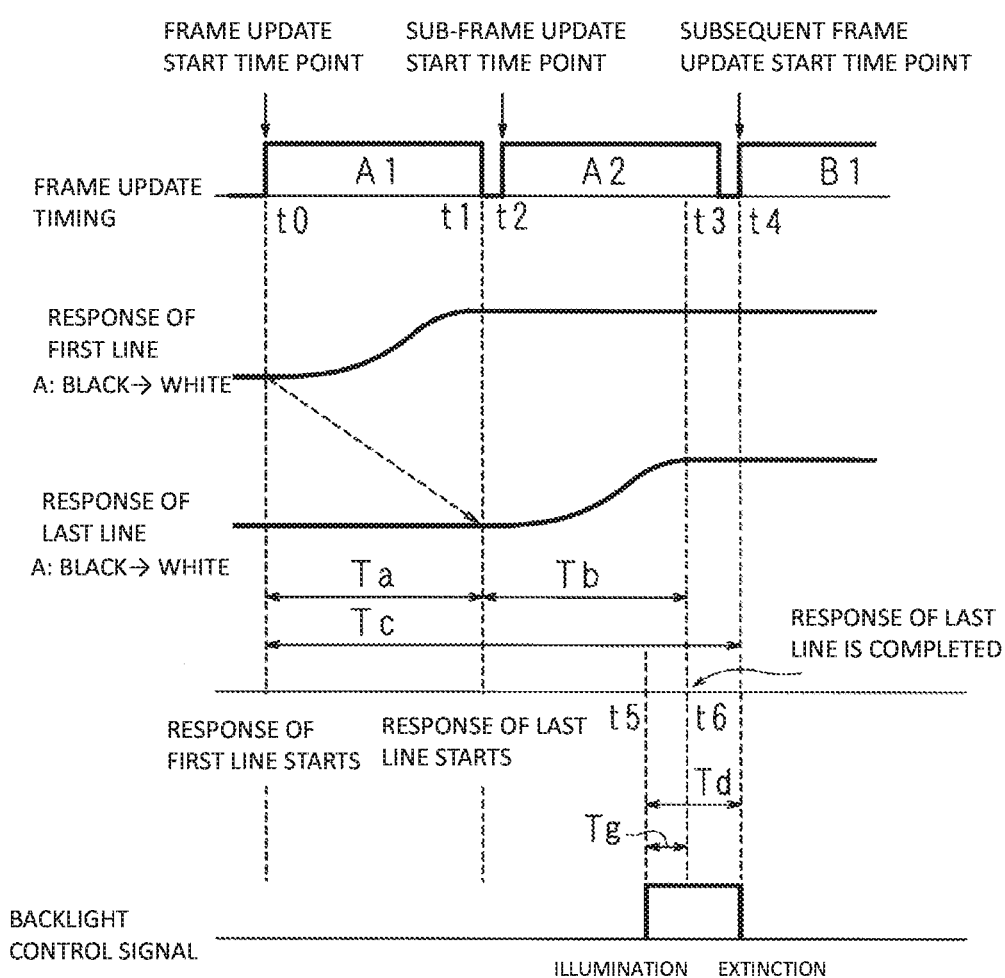
FIG. 6 is a time chart showing a second example in which ghost occurs.

FIG. 6 is a time chart showing a second example in which ghost occurs. The time chart shown in FIG. 6 shows time passage around the left edge of the belt-shaped black image shown in FIG. 4. The frame update timings are similar to those in the example in FIG. 5 and therefore will not be described.

At time point t0, the first pixel line (the highest horizontal pixel line) of the screen of the liquid crystal display panel 10 starts to make a response, and the gradation value (luminance) is changed, for example, from 0 (black) to 255 (white). Then, the second highest and lower pixel lines of the screen of the liquid crystal display panel 10 start to make responses indicating gradual gradation value changes. At time point t1, when a time Ta has elapsed after time point t0, that is, at the time point when one frame has been updated, the last pixel line (the lowest horizontal pixel line) of the screen of the liquid crystal display panel 10 starts to make a response, and the gradation value (luminance) is being changed, for example, from 0 (black) to 255 (white). A response time Tb taken for the liquid crystal state of the black image (e.g., the gradation value 0) to make a complete transition to the liquid crystal state of the white image (e.g., the gradation value 255) is (t6−t1) where t6 is the time point when a response of the last pixel line was finished. Accordingly, it can be said that the liquid crystal state has not made a complete transition (e.g., the gradation value has not become 255) before time point t6 and that the liquid crystal state has made a complete transition (e.g., the gradation value has become 255) at time point t6 and later.

In the transition of liquid crystal state described above, for example, it is assumed that the backlight 20 starts to illuminate at time point t5, which is earlier than time point t6. During a time Tg between time point t5 and time point t6, the liquid crystal state of the previous frame (e.g., the state of the sub-frame A1, that is, the state in which the image X is being changed to the image A, in the example in FIGS. 4 and 5) reflects on the display image, and ghost occurs around the left edge of the belt-shaped black image.

While the transitions of the liquid crystal state from the gradation value 255 to gradation value 0 and from the gradation value 0 to gradation value 255 have been described in the above examples, the transition of the liquid crystal state is not limited thereto. The liquid crystal state may make transitions between gradation values other than 0 and 255.

Figure 7:
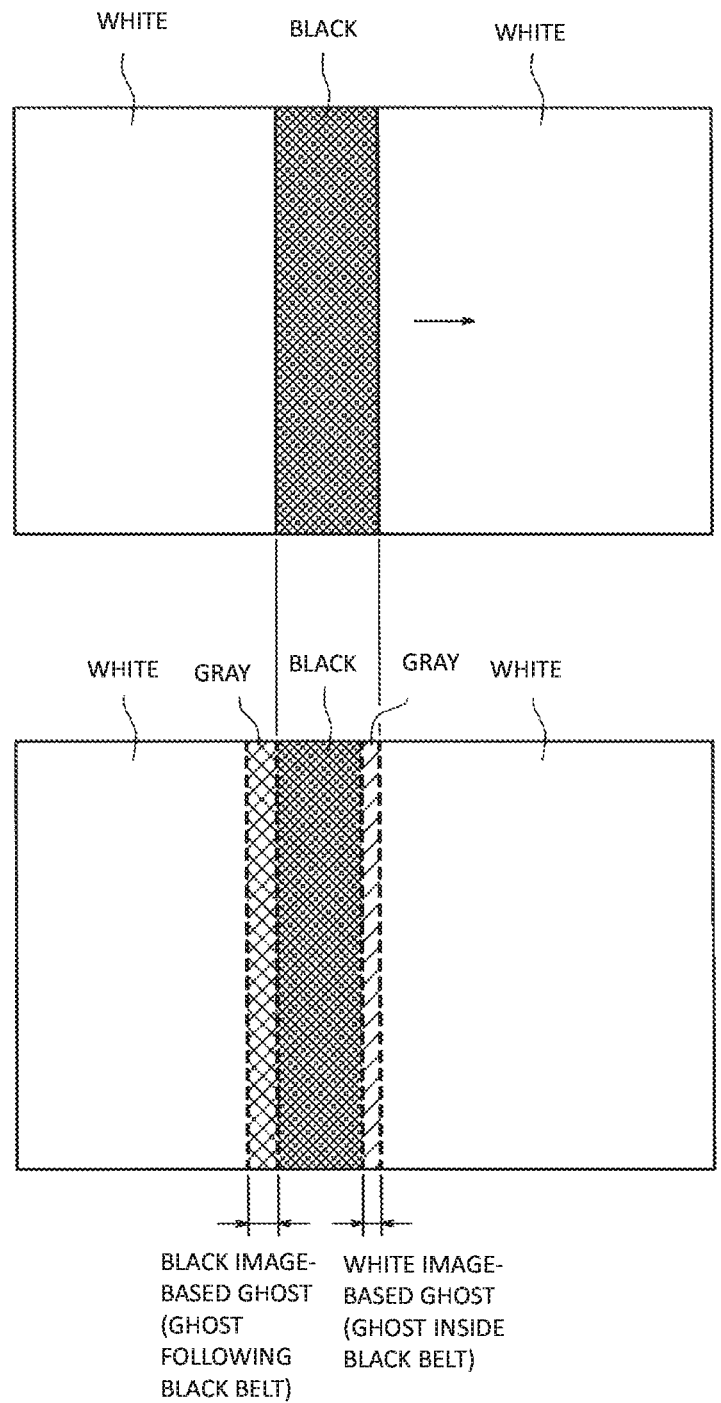
FIG. 7 is a schematic diagram showing an example of ghost.

FIG. 7 is a schematic diagram showing an example of ghost. An upper diagram of FIG. 7 is similar to FIG. 4 and shows an ideal image, in which no ghost is occurring, and shows a case in which a belt-shaped black image is moving on a white screen from the left to the right. A lower diagram of FIG. 7 schematically shows a state in which ghost is occurring. Ghost based on a white image is occurring inside the right edge of the belt-shaped black image. Such ghost occurs due to a mechanism shown in FIG. 5. Also, ghost based on a black image is occurring outside the left edge of the belt-shaped black image. Such ghost occurs due to a mechanism shown in FIG. 6.

Next, a leading edge, which affects the moving image display performance, will be described. A leading edge is a phenomenon in which if the period in which the current frame is illuminated by the backlight 20 overlaps the period in which the liquid crystal state of the current frame is making a transition to the liquid crystal state of the subsequent frame, the liquid crystal state of the subsequent frame reflects on the display image.

Figure 8:
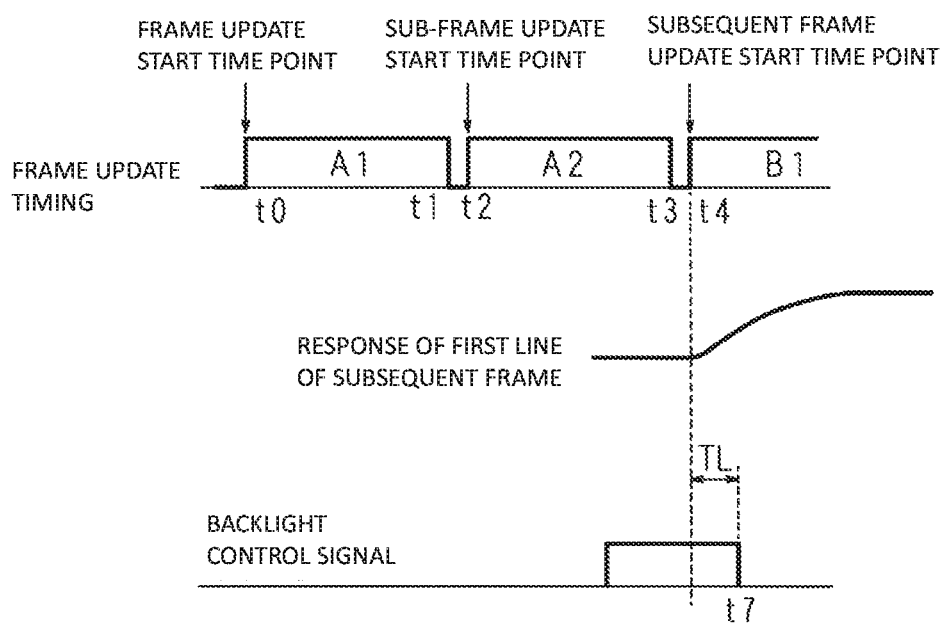
FIG. 8 is a time chart showing an example in which a leading edge occurs.

FIG. 8 is a time chart showing an example in which a leading edge occurs. As shown in FIG. 8, in the frame update timings, a frame update start time point (a sub-frame A1 update start time point) is t0; a sub-frame A1 update end time point is t1; a sub-frame A2 update start time is point t2; a sub-frame A2 update end time point is t3; and a subsequent frame update start time point (a sub-frame B1 update start time point) is t4.

At time point t4, the first pixel line (the highest horizontal pixel line) of a subsequent frame starts to make a response, and the gradation value (luminance) is changed, for example, from 0 (black) to 255 (white). At time point t7, the backlight 20 ends the illumination of the current frame. As shown in FIG. 8, if the time point t7, when the backlight 20 ends the illumination of the current frame, is later than the subsequent frame update start time point t4 and an overlap (a time TL in FIG. 8) occurs between the illumination time of the backlight 20 and the period in which the liquid crystal state of the current frame is being changed to the liquid crystal state of the subsequent frame, there may occur a leading edge, in which the liquid crystal state of the subsequent frame reflects on the display image.

Figure 9:
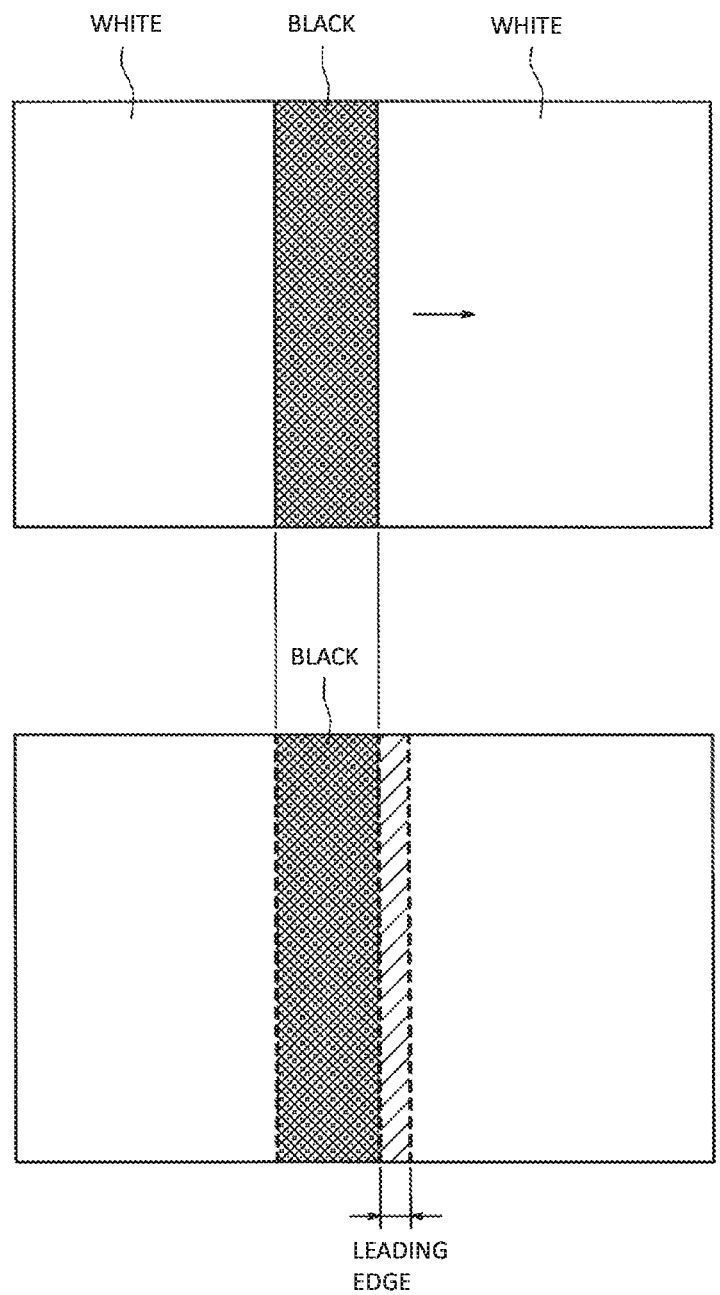
FIG. 9 is a schematic diagram showing an example of a leading edge.

FIG. 9 is a schematic diagram showing an example of a leading edge. An upper diagram of FIG. 9 is similar to FIG. 4 and shows an ideal image, in which no leading edge is occurring and shows a case in which a belt-shaped black image is moving on a white screen from the left to the right. A lower diagram of FIG. 9 schematically shows a state in which a leading edge is occurring. A leading edge based on a black image, which is the liquid crystal state of the subsequent frame, is occurring outside the right edge of the belt-shaped black image. Such a leading edge occurs due to a mechanism shown in FIG. 8.

Next, there will be described a method for reducing the effect of a leading edge and ghost used by the display device 100 of the present embodiment.

Figure 10:
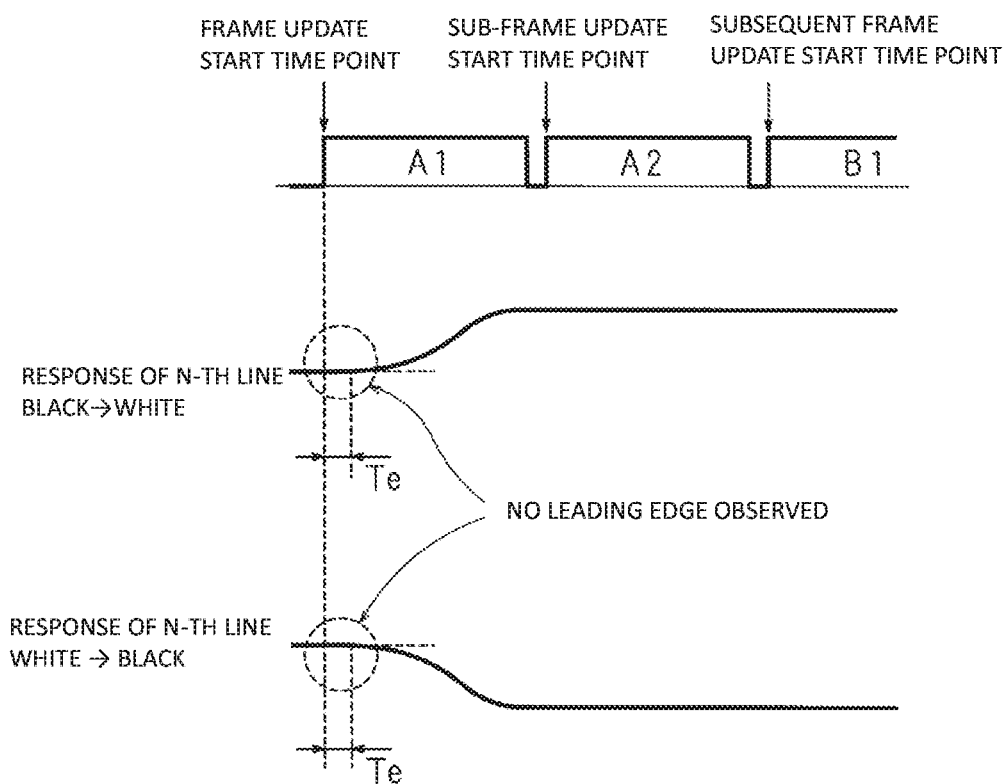
FIG. 10 is a time chart showing an example of the transition of the liquid crystal state of the liquid crystal display panel near the frame update start time point.

FIG. 10 is a time chart showing an example of the transition of the liquid crystal state of the liquid crystal display panel 10 near the frame update start time point. The frame is updated sequentially in the order of a frame update start time point (a sub-frame A1 update start time point), a sub-frame A1 update end time point, a sub-frame A2 update start time point, a sub-frame A2 update end time point, and a subsequent frame update start time point (a sub-frame B1 update start time point).

The inventors noted that the transition of the liquid crystal state immediately after the frame update start time point was extremely gentle and that the transition of the liquid crystal state (i.e., the change in gradation value) was extremely small within a predetermined period from the frame update start time point. That is, as shown in FIG. 10, in the transitions of the liquid crystal state from black (gradation value 0) to white (gradation value 255) and from white (gradation value 255) to black (gradation value 0), the N-th line (N is a number of 1 to the horizontal line number) of the screen of the liquid crystal display panel 10 makes an extremely gentle response and no leading edge is observed within a predetermined time (e.g., a time Te) from the frame update start time point. Note that the gradation values are not limited to white and black.

The backlight controller 40 outputs a control signal for controlling the backlight 20 so that the backlight 20 starts to illuminate after the update of one frame is started and ends illumination at the time point when the update of a frame subsequent to the one frame is started or after the time point.

If the backlight 20 starts to illuminate before the liquid crystal state makes a complete transition (that is, if the backlight 20 starts to illuminate before the response time Tb of the display panel passes), there may occur ghost, in which the liquid crystal state of the previous frame reflects on the display image, as shown in FIGS. 5 and 6. On the other hand, as shown in FIG. 10, the liquid crystal state makes an extremely gentle transition immediately after the frame update start time point, and the transition of the liquid crystal state (that is, the change in gradation value) is extremely small within a predetermined period from the frame update start time point. By noting this point and outputting a control signal for controlling the backlight 20 so that the backlight 20 ends illumination at the time point when the update of the subsequent frame is started or after the time point, it is possible to delay the time point when the backlight 20 starts to illuminate, with respect to a control signal in the same illumination period. By delaying the time point when the backlight 20 starts to illuminate, it is possible to make a nearly complete transition of the liquid crystal state before the backlight 20 starts to illuminate and to bring the gradation value closer to that after transition. As a result, the effect of ghost can be reduced.

As shown in FIG. 10, the liquid crystal state makes an extremely gentle transition immediately after the frame update start time point, and the transition of the liquid crystal state (that is, the change in gradation value) is extremely small within a predetermined period from the frame update start time point. Accordingly, by setting the illumination end time point (the extinction start time point) of the backlight 20 in a range from the frame update start time point to the time point when the predetermined time has elapsed, the effect of a leading edge can be reduced. In this way, the effect of ghost can be reduced while reducing the effect of a leading edge. As a result, the moving image display performance can be improved.

Further, the backlight controller 40 outputs a control signal for controlling the backlight 20 so that the backlight 20 ends illumination after a predetermined time has elapsed since the subsequent frame update start time point. For example, the backlight controller 40 outputs a control signal for ending illumination of the backlight 20 at a time point after the predetermined time has elapsed since the subsequent frame update start time point. Since the illumination end time point of the backlight 20 can be delayed by the predetermined time compared to when the illumination end time point is the subsequent frame update start time point, the illumination start time point of the backlight can be delayed by a time corresponding to the delayed time of the illumination end time point. As a result, the effect of ghost can be reduced.

Further, in response to an adjustment made by adjustment means that adjusts the screen luminance of the liquid crystal display panel 10, the backlight controller 40 outputs a control signal for controlling the illumination start time point of the backlight 20. That is, in increasing the screen luminance of the liquid crystal display panel 10, the backlight controller 40 increases the illumination period of the backlight 20 by advancing the illumination start time point of the backlight 20; in reducing the screen luminance of the liquid crystal display panel 10, it reduces the illumination period of the backlight 20 by delaying the illumination start time point of the backlight 20. Thus, it is possible to always fix the illumination end time point (the extinction start time point) of the backlight 20 and thus to suppress a leading edge which occurs when the illumination end time point of the backlight 20 varies and is delayed excessively. As a result, the effect of a leading edge can be reduced.

Figure 11:
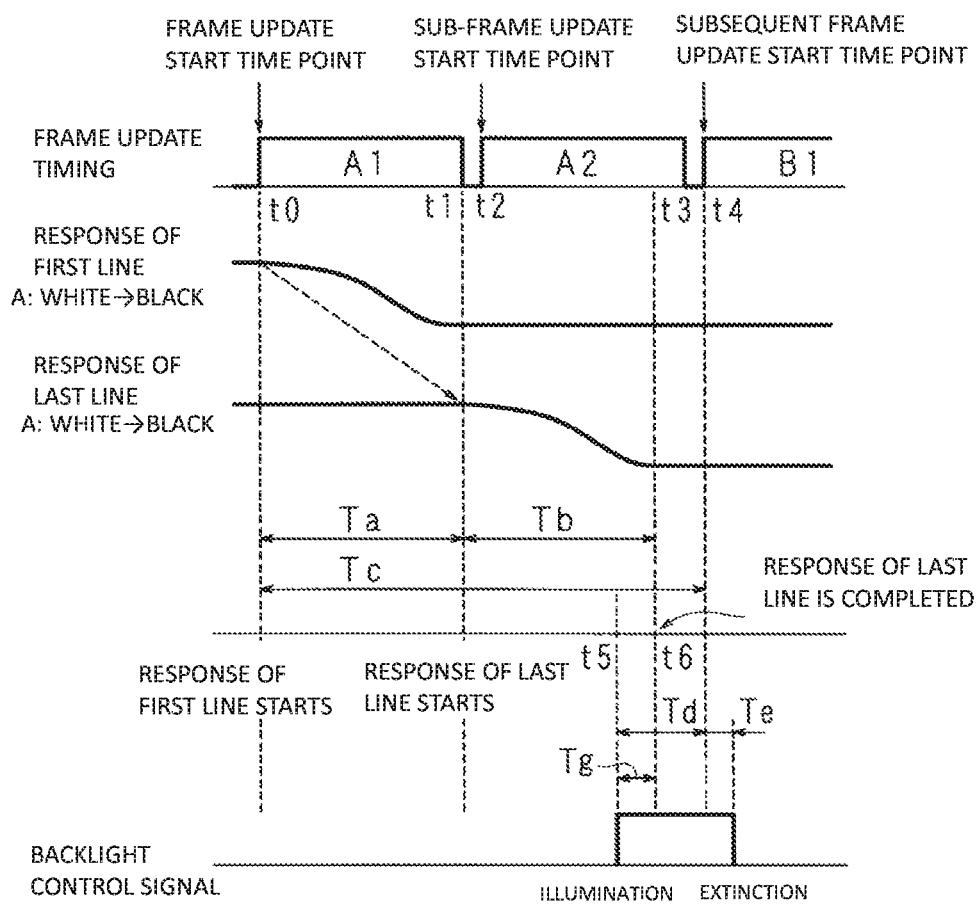
FIG. 11 is a time chart showing an example of backlight illumination control performed by the display device of the present embodiment.

FIG. 11 is a time chart showing an example of the illumination control of the backlight 20 by the display device 100 of the present embodiment. FIG. 11 is approximately similar to the time chart shown in FIG. 5. As shown in FIG. 11, in the frame update timings, a frame update start time point (a sub-frame A1 update start time point) is t0; a sub-frame A1 update end time point is t1; a sub-frame A2 update start time point is t2; a sub-frame A2 update end time point is t3; and a subsequent frame update start time point (a sub-frame B1 update start time point) is t4.

At time point t0, the first pixel line (the highest horizontal pixel line) of the screen of the liquid crystal display panel 10 starts to make a response, and the gradation value (luminance) is changed, for example, from 255 (white) to 0 (black). Then, the second highest and lower pixel lines of the screen of the liquid crystal display panel 10 start to make responses indicating gradual gradation value changes. At a time point t1, when a time Ta has elapsed after time point t0, that is, at the time point when one frame has been updated, the last pixel line (the lowest horizontal pixel line) of the screen of the liquid crystal display panel 10 starts to make a response, and the gradation value (luminance) is being changed, for example, from 255 (white) to 0 (black). A response time Tb taken for the liquid crystal state of the white image (e.g., the gradation value 255) to make a complete transition to the liquid crystal state of the black image (e.g., the gradation value 0) is (t6−t1) where t6 is the time point when the last pixel line has made a response. Accordingly, it can be said that the liquid crystal state has not made a complete transition (e.g., the gradation value has not become 0) before time point t6 and that the liquid crystal state has made a complete transition (e.g., the gradation value has become 0) at time point t6 and later. At time point t5, the backlight 20 starts to illuminate, and when a time Te has elapsed after the subsequent frame update start time point t4, the backlight 20 ends the illumination.

As shown in FIG. 11, Ta represents the time taken to update one frame (sub-frame); Tb represents a response time corresponding to a change in gradation value of the liquid crystal display panel 10; Tc represents a predetermined period for changing one image; Td represents the time from the illumination start time point t5 of the backlight 20 after the time point when the update of one frame is started (the time point t0) to the update start time point t4 of a frame subsequent to the one frame; Te represents the time from the update start time point t4 of the subsequent frame to the illumination end time point of the backlight 20; and Tg represents a time represented by Formula {Td−[Tc−(Ta+Tb)]}.

When the time Tg>0, the backlight controller 40 outputs a control signal so that the time Tg>the time Te. The term "when the time Tg>0" means that the backlight 20 starts to illuminate before the response time Tb of the liquid crystal display panel 10 ends and means that so-called ghost occurs. The time Tg is a time that contributes to the occurrence of ghost. As the time Tg is increased, the effect of ghost is increased. The time Te is a time that contributes to the occurrence of a leading edge. When a predetermined time is exceeded, the effect of a leading edge appears. By outputting a control signal so that a relationship of the time Tg>the time Te is established, it is possible to reduce the effect of ghost while reducing the effect of a leading edge. As a result, the moving image display performance can be improved.

Figure 12:
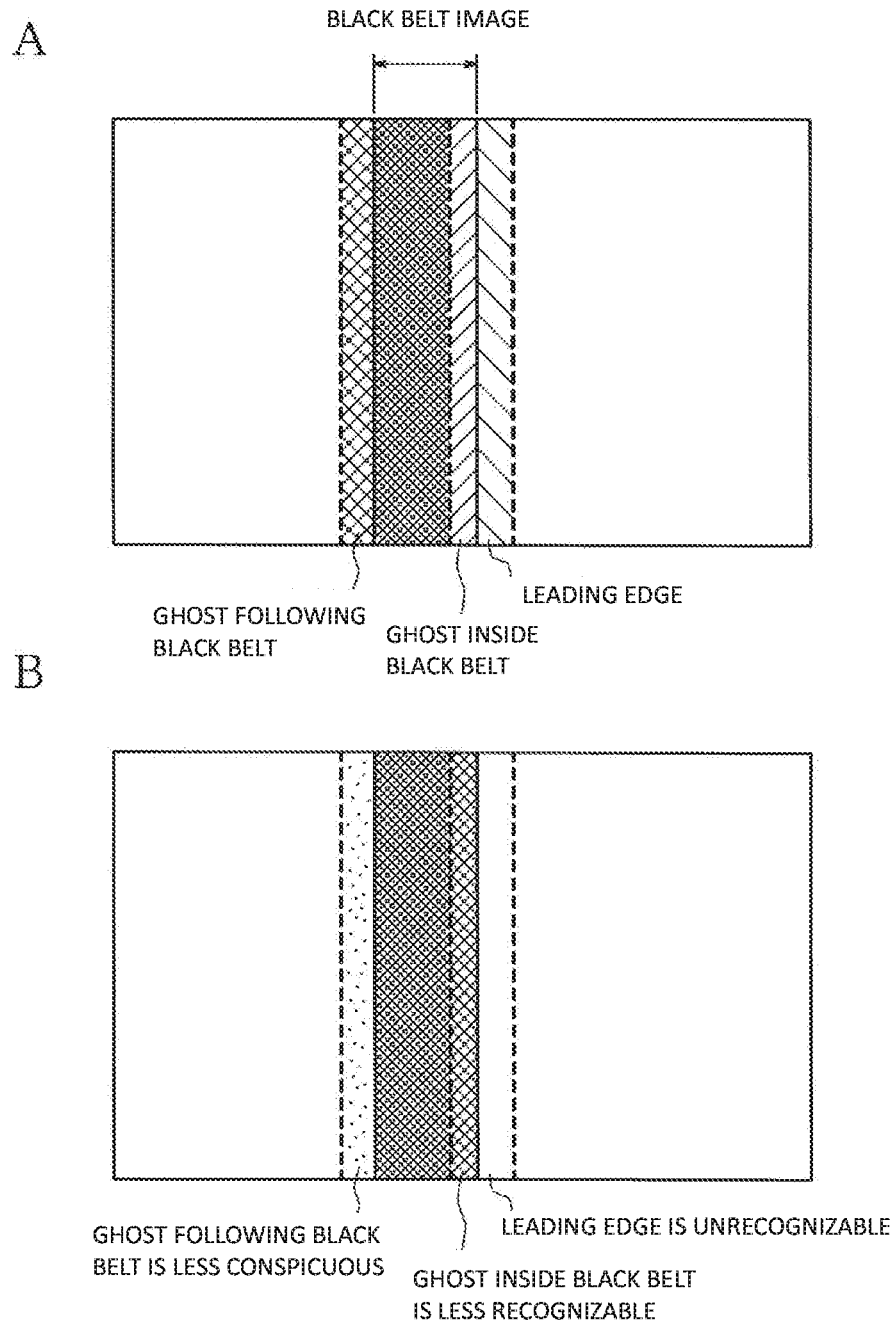
FIG. 12 includes schematic diagrams showing an example in which an improvement is made to the moving image display performance of the display device of the present embodiment.

FIG. 12 is a schematic diagram showing an example in which an improvement is made to the moving image display performance of the display device 100 of the present embodiment. FIG. 12A shows an example of a conventional display image and is similar to those shown in FIGS. 7 and 9. That is, ghost based on a white image is occurring inside the right edge of a belt-shaped black image. Also, ghost based on a black image is occurring outside the left edge of the belt-shaped black image. Further, a leading edge based on a black image, which is the liquid crystal state of the subsequent frame, is occurring outside the right edge of the belt-shaped black image.

On the other hand, FIG. 12B shows an example of the display image on the display device 100 of the present embodiment. In FIG. 12B, ghost inside the right edge of a belt-shaped black image and ghost outside the left edge thereof are reduced so that they are less conspicuous (less recognizable). A leading edge is also reduced to the extent that it is unrecognizable.

While, in the example in FIG. 1, the liquid crystal display panel 10 outputs a vertical synchronization signal to the backlight controller 40, other configurations may be employed. For example, there may be disposed a vertical synchronization signal generation unit separate from the liquid crystal display panel 10.

Figure 13:
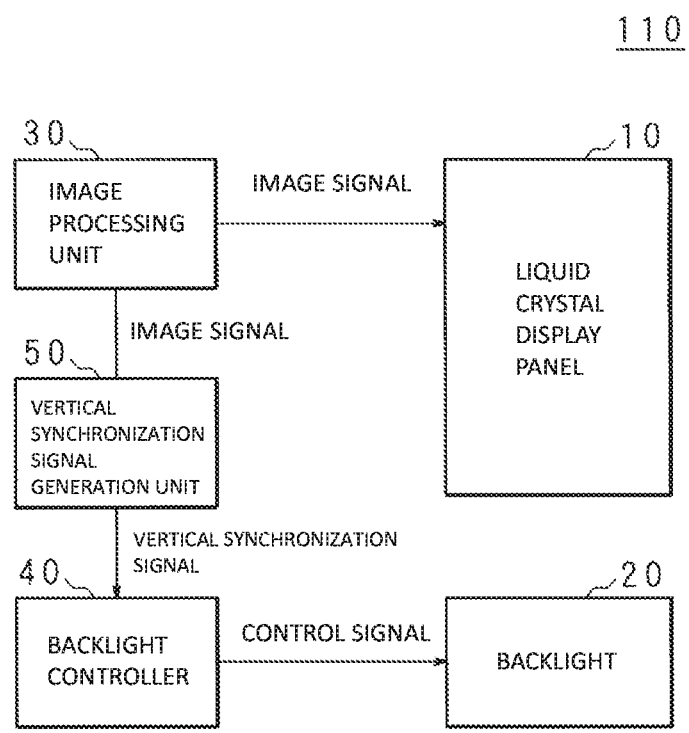
FIG. 13 is a block diagram showing an example configuration of a display device including a first example of a vertical synchronization signal generation unit.

FIG. 13 is a block diagram showing an example configuration of a display device 110 including a first example of a vertical synchronization signal generation unit. As shown in FIG. 13, an image processing unit 30 outputs an image signal to a vertical synchronization signal generation unit 50. The vertical synchronization signal generation unit 50 generates a vertical synchronization signal from the received image signal and outputs the generated vertical synchronization signal to a backlight controller 40. The backlight controller 40 generates a control signal from the received vertical synchronization signal and outputs the generated control signal to a backlight 20.

Figure 14:
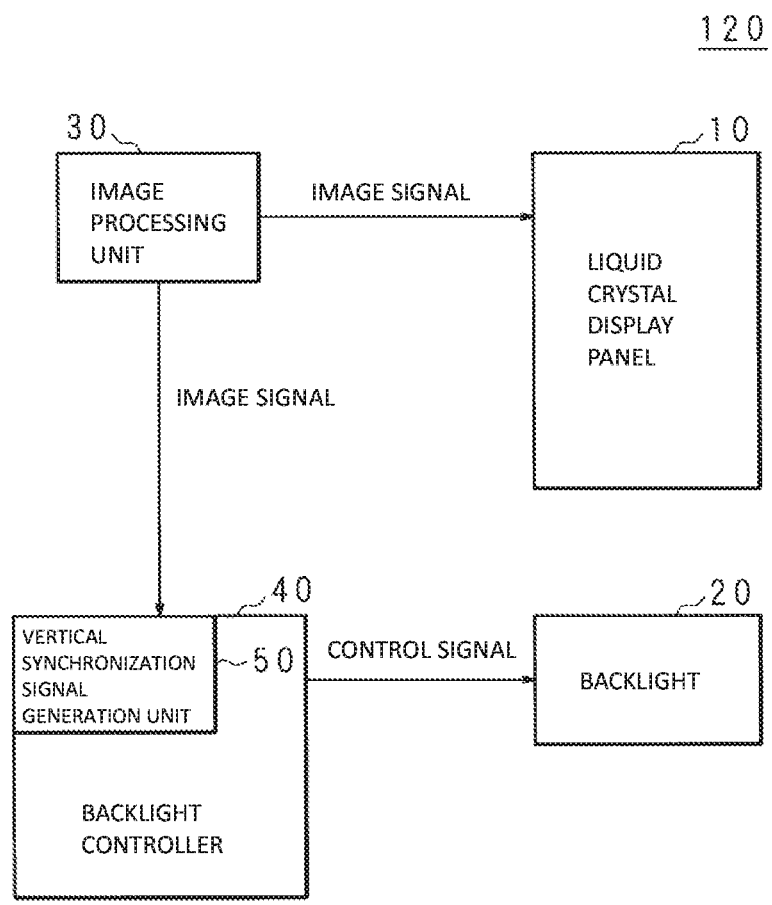
FIG. 14 is a block diagram showing an example configuration of a display device including a second example of a vertical synchronization signal generation unit.

FIG. 14 is a block diagram showing an example configuration of a display device 120 including a second example of a vertical synchronization signal generation unit. As shown in FIG. 14, the second example is a configuration in which a backlight controller 40 incorporates a vertical synchronization signal generation unit 50.

Figure 15:
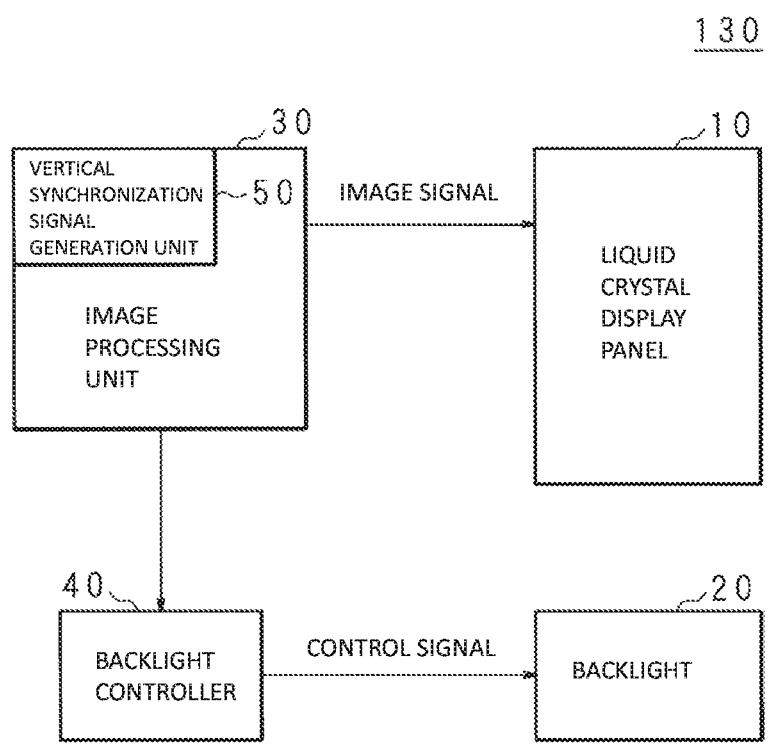
FIG. 15 is a block diagram showing an example configuration of a display device including a third example of a vertical synchronization signal generation unit.

FIG. 15 is a block diagram showing an example configuration of a display device 130 including a third example of a vertical synchronization signal generation unit. As shown in FIG. 15, the third example is a configuration in which an image processing unit 30 incorporates a vertical synchronization signal generation unit 50.

Figure 16:
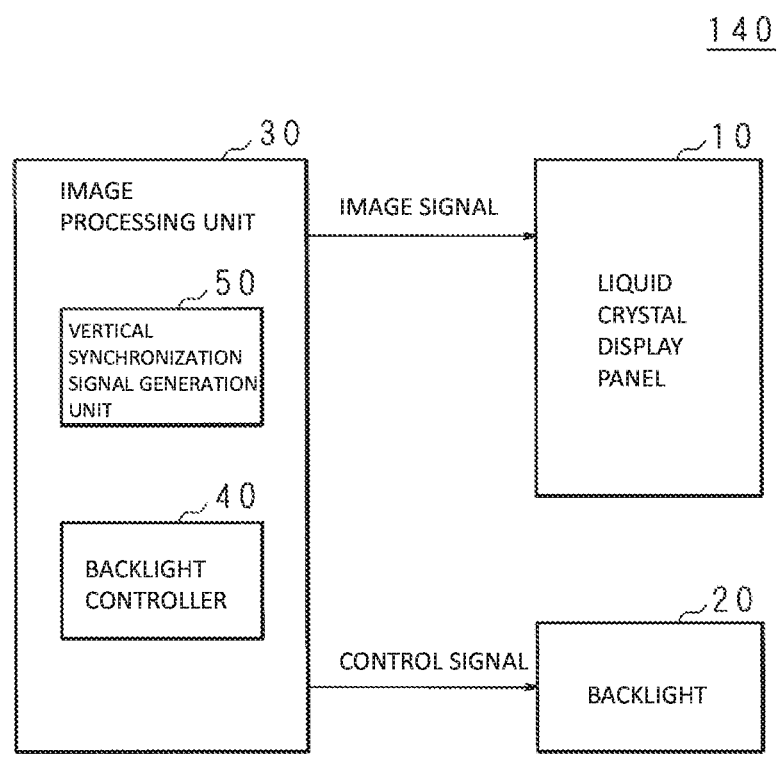
FIG. 16 is a block diagram showing an example configuration of a display device including a fourth example of a vertical synchronization signal generation unit.

FIG. 16 is a block diagram showing an example configuration of a display device 140 including a fourth example of a vertical synchronization signal generation unit. As shown in FIG. 16, the fourth example is a configuration in which an image processing unit 30 incorporates a backlight controller 40 and a vertical synchronization signal generation unit 50.

Figure 17:
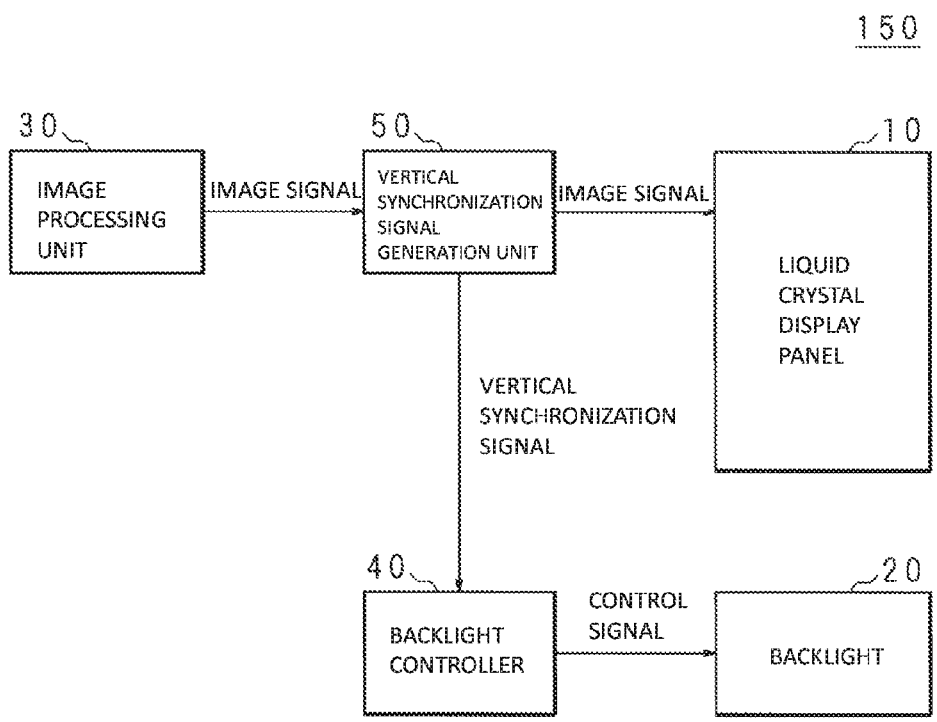
FIG. 17 is a block diagram showing an example configuration of a display device including a fifth example of a vertical synchronization signal generation unit.

FIG. 17 is a block diagram showing an example configuration of a display device 150 including a fifth example of a vertical synchronization signal generation unit. As shown in FIG. 17, the fifth example is a configuration in which a vertical synchronization signal generation unit 50 is disposed between an image processing unit 30 and a liquid crystal display panel 10. In this case, the vertical synchronization signal generation unit 50 outputs an image signal outputted from the image processing unit 30 to the liquid crystal display panel 10 as it is, as well as generates a vertical synchronization signal from the image signal and outputs the generated vertical synchronization signal to a backlight controller 40.

While, in the above embodiment, a vertical synchronization signal is used as a signal that synchronizes the start of update of a frame on the liquid crystal display panel 10, the signal that synchronizes the start of update of a frame on the liquid crystal display panel 10 is not limited to a vertical synchronization signal.

Figure 18:
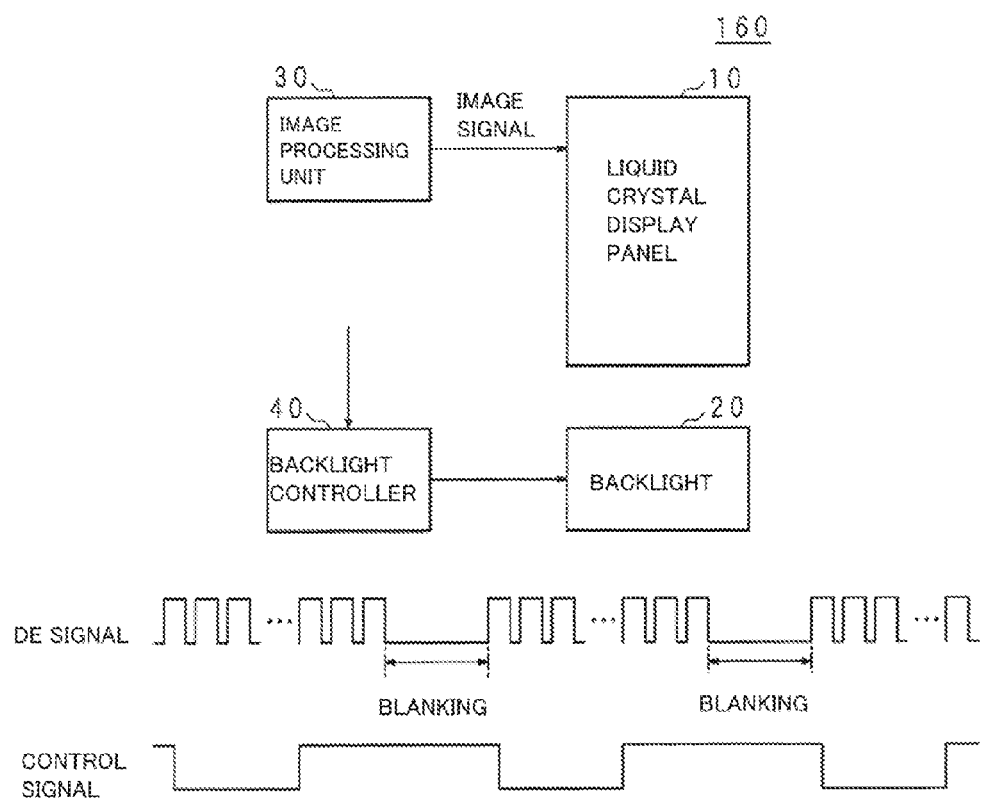
FIG. 18 is a block diagram showing an example configuration of a display device that uses a data enable signal.

FIG. 18 is a block diagram showing an example configuration of a display device 160 that uses a data enable signal. As shown in FIG. 18, a backlight controller 40 may control the illumination and extinction of a backlight in synchronization with a data enable (DE) signal which allows for the determination of vertical synchronization such as the blanking period for controlling a liquid crystal display panel 10. While, in the above examples, a control signal that synchronizes a vertical synchronization signal for the liquid crystal display panel 10 or a data enable signal which allows for the determination of vertical synchronization is used as a control signal for controlling the illumination and extinction of the backlight 20, any type of control signal may be used as long as it synchronizes the start of update of a frame for the liquid crystal display panel 10.

In the above embodiment, as described above, it is possible to remove a leading edge, as well as to reduce the time in which ghost occurs. Thus, it is possible to reduce the blurring of the boundary, where the gradation value varies, as well as to improve the display performance of entire moving images.

While, in the above embodiment, the white-to-black and black-to-white transitions have been described as examples of the transition of the liquid crystal state, the same applies to colors (gradation values) other than white or black as well.

REFERENCE SIGNS LIST 10 liquid crystal display panel
20 backlight
30 image processing unit
40 backlight controller

The invention claimed is:

1. A display device with a display panel and a backlight for the display panel, the display device comprising:
control means configured to output a control signal for controlling illumination and extinction of the backlight, to the backlight;
update means configured to update at least a first sub-frame and a second sub-frame in each predetermined period in order to change one image displayed on a screen of the display panel, and
wherein the control means outputs a control signal for controlling the backlight so that the backlight starts to illuminate at some point in time from the start of update of the second sub-frame in one period until the finish of the update and ends illumination at the time point when the update means starts to update the first sub-frame in a period subsequent to the one period or after the time point;
wherein the update means updates a plurality of sub-frames comprising the first sub-frame and the second sub-frame in the respective predetermined periods,
when Tg>0, the control means outputs a control signal so that Tg>Te,
Tg represents a time represented by a formula {Td−[Tc−(Ta+Tb)]},
Ta represents a time required to update one sub-frame,
Tb represents a response time corresponding to a change in a gradation value of the display panel,
Tc represents the predetermined period,
Td represents a time from the time point when the backlight starts to illuminate after the update means starts to update the second sub-frame in one period to the time point when the update means starts to update the first sub-frame in a period subsequent to the one period, and
Te represents a time from the time point when the update means starts to update the first sub-frame in a period subsequent to the one period to the time point when the backlight ends illumination.

2. The display device of claim 1, wherein the first sub-frame is a sub-frame which comes first in each predetermined period, and the second sub-frame is a sub-frame which comes last in each predetermined period.

3. The display device of claim 1, wherein the time point when the backlight ends illumination according to the control signal is fixed in each period regardless of a change of a gradation value of the display panel.

4. The display device of claim 2, wherein the time point when the backlight ends illumination according to the control signal is fixed in each period regardless of a change of a gradation value of the display panel.

5. The display device of claim 1, wherein the control means outputs a control signal for controlling the backlight so that the backlight ends illumination after a predetermined time has elapsed since the first sub-frame update start time point.

6. The display device of claim 1, further comprising:
adjustment means configured to adjust luminance of a screen of the display panel, wherein the control means outputs a control signal for controlling the time point when
the backlight starts to illuminate, in response to an adjustment made by the adjustment means.

7. A display method used by a display device that comprises a display panel and a backlight for the display panel, the display method comprising:
- a step of outputting a control signal for controlling illumination and extinction of the backlight, to the backlight; and
- a step of updating at least a first sub-frame and a second sub-frame in each predetermined period in order to change one image displayed on a screen of the display panel,
- wherein the outputting step comprises outputting a control signal for controlling the backlight so that the backlight starts to illuminate at some point in time from the start of update of the second sub-frame in one period until the finish of the update and ends illumination at the time point when update of the first sub-frame in a period subsequent to the one period is started or after the time point;
- wherein the step of updating comprises updating a plurality of sub-frames comprising the first sub-frame and the second sub-frame in the respective predetermined periods, when $Tg>0$, a control signal is output so that $Tg>Te$, $Tg$ represents a time represented by a formula $\{Td-[Tc-(Ta+Tb)]\}$, $Ta$ represents a time required to update one sub-frame, $Tb$ represents a response time corresponding to a change in a gradation value of the display panel, $Tc$ represents the predetermined period, $Td$ represents a time from the time point when the backlight starts to illuminate after the step of updating begins for the second sub-frame in one period to the time point when the step of updating begins for the first sub-frame in a period subsequent to the one period, and $Te$ represents a time from the time point when the step of updating begins for the first sub-frame in a period subsequent to the one period to the time point when the backlight ends illumination.

* * * * *